US010880426B2

(12) United States Patent
Bocking et al.

(10) Patent No.: US 10,880,426 B2
(45) Date of Patent: *Dec. 29, 2020

(54) HANDHELD ELECTRONIC DEVICE HAVING IMPROVED PHONE CALL LOG, AND ASSOCIATED METHOD

(71) Applicant: BlackBerry Limited, Waterloo (CA)

(72) Inventors: Andrew Douglas Bocking, Los Altos, CA (US); Raymond Paul Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,755

(22) Filed: May 13, 2019

(65) Prior Publication Data

US 2019/0268464 A1    Aug. 29, 2019

Related U.S. Application Data

(63) Continuation of application No. 15/820,088, filed on Nov. 21, 2017, now Pat. No. 10,291,770, which is a
(Continued)

(51) Int. Cl.
*H04M 1/725* (2006.01)
*H04M 1/57* (2006.01)
(Continued)

(52) U.S. Cl.
CPC ....... *H04M 1/72583* (2013.01); *H04M 1/575* (2013.01); *H04M 1/72519* (2013.01);
(Continued)

(58) Field of Classification Search
CPC .. H04M 1/575; H04M 1/725; H04M 1/72519; H04M 1/72583; H04M 3/2218;
(Continued)

(56) References Cited

U.S. PATENT DOCUMENTS 5,394,445 A    2/1995 Ball et al.
5,517,549 A    5/1996 Lee
(Continued)

FOREIGN PATENT DOCUMENTS

EP    0809411 A1    11/1997
EP    1033878 A2    9/2000
(Continued)

OTHER PUBLICATIONS

Japanese Office Action dated Mar. 4, 2014; Application No. 2013-000921; 13 pages.
(Continued)

*Primary Examiner* — Gerald Gauthier
(74) *Attorney, Agent, or Firm* — Conley Rose, P. C.; J. Robert Brown, Jr.; Joseph J. Funston, III

(57) ABSTRACT

An improved handheld electronic device and an associated method provide an improved call log that presents information relating to logged phone calls in a collapsed manner, meaning that for each phone number having a call stored in the memory of the device, only the most recent in time call is listed on the call log. An improved handheld electronic device and an associated method also provide a call history for any phone call from the improved call log that is selected by the user. The call history includes a listing of all of the calls stored by the device that are associated with the selected call log call.

19 Claims, 5 Drawing Sheets

Related U.S. Application Data continuation of application No. 14/083,075, filed on Nov. 18, 2013, now Pat. No. 9,843,666, which is a continuation of application No. 13/163,464, filed on Jun. 17, 2011, now Pat. No. 8,620,289, which is a continuation of application No. 11/688,444, filed on Mar. 20, 2007, now Pat. No. 8,175,259, which is a continuation of application No. 10/939,828, filed on Sep. 13, 2004, now Pat. No. 7,280,652.

(51) Int. Cl.
| | | |
|---|---|---|
| *H04M 3/22* | (2006.01) | |
| *H04M 15/28* | (2006.01) | |
| *H04M 15/00* | (2006.01) | |
| *H04W 4/24* | (2018.01) | |
| *H04W 4/12* | (2009.01) | |

(52) U.S. Cl.
CPC .......... *H04M 3/2218* (2013.01); *H04M 15/28* (2013.01); *H04M 15/58* (2013.01); *H04W 4/12* (2013.01); *H04W 4/24* (2013.01); *H04M 2215/0188* (2013.01); *H04M 2215/2026* (2013.01); *H04M 2215/32* (2013.01)

(58) Field of Classification Search
CPC ................. H04M 15/28; H04M 15/58; H04M 2215/0188; H04M 2215/2026; H04M 2215/32; H04W 4/12; H04W 4/24
USPC .... 379/112.01, 140, 142.01, 142.02, 355.02, 379/355.05, 88.11, 88.17, 88.21, 93.23, 379/93.24, 142.04, 142.14, 207.15, 88.19, 379/210.02; 455/414.1, 415, 556.2, 558, 455/566, 412, 1, 414.2, 416, 419, 420, 455/456.1, 457, 557, 564, 412.1, 466, 455/463; 709/239, 206; 382/181; 715/816; 717/136; 345/169
See application file for complete search history.

(56) References Cited

U.S. PATENT DOCUMENTS

| | | | |
|---|---|---|---|
| 5,592,546 A * | 1/1997 | Takahashi | H04M 1/2748 |
| | | | 379/355.05 |
| 5,651,054 A * | 7/1997 | Dunn | H04M 3/533 |
| | | | 379/204.01 |
| 5,734,706 A | 3/1998 | Windsor et al. | |
| 5,742,669 A | 4/1998 | Lim | |
| 5,825,353 A | 10/1998 | Will | |
| 5,903,632 A | 5/1999 | Brandon | |
| 5,943,055 A | 8/1999 | Sylvan | |
| 6,011,841 A | 1/2000 | Isono | |
| 6,064,725 A * | 5/2000 | Nakanishi | H04M 1/2747 |
| | | | 379/140 |
| 6,067,349 A * | 5/2000 | Suder | H04M 1/27485 |
| | | | 379/88.19 |
| 6,178,338 B1 | 1/2001 | Yamagishi et al. | |
| 6,288,718 B1 | 9/2001 | Laursen et al. | |
| 6,298,250 B1 | 10/2001 | Nilsson | |
| 6,320,943 B1 | 11/2001 | Borland | |
| 6,374,125 B1 | 4/2002 | Toba | |
| 6,466,236 B1 | 10/2002 | Pivowar et al. | |
| 6,526,274 B1 | 2/2003 | Fickes et al. | |
| 6,529,873 B1 | 3/2003 | Owen | |
| 6,744,423 B2 * | 6/2004 | Kraft | G06F 3/0237 |
| | | | 345/169 |
| 6,891,940 B1 | 5/2005 | Bhandari et al. | |
| 6,909,910 B2 | 6/2005 | Pappalardo et al. | |
| 6,931,258 B1 | 8/2005 | Jarnstrom et al. | |
| 7,027,461 B1 | 4/2006 | Bontempi | |
| 7,046,994 B1 | 5/2006 | Padawer et al. | |
| 7,233,650 B1 | 6/2007 | Canny | |
| 7,280,817 B2 | 10/2007 | Comp | |
| 7,289,614 B1 * | 10/2007 | Twerdahl | H04M 1/2747 |
| | | | 379/142.01 |
| 7,308,253 B2 | 12/2007 | Moody et al. | |
| 7,412,047 B2 | 8/2008 | Nguyen et al. | |
| 7,512,400 B2 | 3/2009 | Starbuck et al. | |
| 7,778,399 B2 * | 8/2010 | Ambrose | H04M 1/56 |
| | | | 379/142.01 |
| 7,941,762 B1 * | 5/2011 | Tovino | H04L 51/046 |
| | | | 379/201.01 |
| 8,150,922 B2 * | 4/2012 | Griffin | H04L 12/1827 |
| | | | 709/206 |
| 8,175,259 B2 | 5/2012 | Bocking et al. | |
| 8,229,407 B2 | 7/2012 | Bocking et al. | |
| 8,325,899 B2 * | 12/2012 | Martin | H04M 19/041 |
| | | | 379/210.02 |
| 8,411,845 B2 * | 4/2013 | Bocking | H04M 1/72583 |
| | | | 379/355.02 |
| 8,504,080 B2 | 8/2013 | Jo et al. | |
| 8,620,289 B2 | 12/2013 | Bocking et al. | |
| 8,686,178 B2 | 3/2014 | Pappalardo et al. | |
| 8,700,074 B2 * | 4/2014 | Kang | H04M 1/72547 |
| | | | 455/466 |
| 8,843,666 B2 | 9/2014 | Besmer et al. | |
| 8,861,694 B1 * | 10/2014 | Kirchhoff | H04Q 3/0016 |
| | | | 379/142.02 |
| 9,667,810 B1 | 5/2017 | Brown | |
| 9,843,666 B2 * | 12/2017 | Bocking | H04M 1/575 |
| 10,291,770 B2 * | 5/2019 | Bocking | H04M 3/2218 |
| 2001/0042103 A1 * | 11/2001 | Tomari | H04M 1/575 |
| | | | 709/206 |
| 2001/0053708 A1 | 12/2001 | Sugiyama et al. | |
| 2002/0029246 A1 | 3/2002 | Kumagai | |
| 2002/0123368 A1 | 9/2002 | Yamadera et al. | |
| 2002/0132638 A1 | 9/2002 | Plahte et al. | |
| 2002/0142758 A1 * | 10/2002 | Abiko | H04M 1/2746 |
| | | | 455/412.1 |
| 2002/0150222 A1 | 10/2002 | Ojiro | |
| 2002/0151334 A1 | 10/2002 | Sharma | |
| 2002/0183091 A1 | 12/2002 | Heo | |
| 2003/0011564 A1 | 1/2003 | Ushino et al. | |
| 2003/0013491 A1 | 1/2003 | Moriki | |
| 2003/0032455 A1 * | 2/2003 | Watanabe | G06F 3/0482 |
| | | | 455/566 |
| 2003/0050054 A1 | 3/2003 | Siu | |
| 2003/0064707 A1 * | 4/2003 | Yoneyama | H04M 1/72552 |
| | | | 455/412.1 |
| 2003/0076941 A1 | 4/2003 | Tiliks et al. | |
| 2003/0086552 A1 | 5/2003 | Tiliks et al. | |
| 2003/0100295 A1 * | 5/2003 | Sakai | H04M 1/576 |
| | | | 455/415 |
| 2003/0126288 A1 * | 7/2003 | Tsurusaki | H04M 1/2749 |
| | | | 709/239 |
| 2003/0139192 A1 * | 7/2003 | Chmaytelli | H04M 15/765 |
| | | | 455/463 |
| 2003/0148753 A1 | 8/2003 | Pappalardo et al. | |
| 2003/0148790 A1 * | 8/2003 | Pappalardo | G06F 16/248 |
| | | | 455/558 |
| 2003/0185365 A1 | 10/2003 | Mansfield | |
| 2004/0102225 A1 * | 5/2004 | Furuta | H04M 1/576 |
| | | | 455/566 |
| 2004/0132438 A1 | 7/2004 | White | |
| 2004/0203674 A1 | 10/2004 | Shi et al. | |
| 2004/0214558 A1 | 10/2004 | Chang et al. | |
| 2004/0224670 A1 * | 11/2004 | Hull | H04M 1/72547 |
| | | | 455/412.1 |
| 2004/0235520 A1 * | 11/2004 | Cadiz | H04M 1/2473 |
| | | | 455/557 |
| 2005/0032527 A1 | 2/2005 | Sheha et al. | |
| 2005/0125211 A1 | 6/2005 | Nahata et al. | |
| 2005/0143135 A1 * | 6/2005 | Brems | H04M 1/72519 |
| | | | 455/564 |
| 2005/0157860 A1 | 7/2005 | Schnarel et al. | |
| 2005/0182798 A1 | 8/2005 | Todd et al. | |
| 2006/0002536 A1 | 1/2006 | Ambrose | |
| 2006/0025112 A1 | 2/2006 | Hamanaga et al. | |

(56) References Cited

U.S. PATENT DOCUMENTS

| | | | |
|---|---|---|---|
| 2006/0056606 A1* | 3/2006 | Bocking | H04M 1/575 379/112.01 |
| 2006/0058063 A1* | 3/2006 | Bocking | G06F 3/0482 455/556.2 |
| 2007/0150608 A1 | 6/2007 | Randall et al. | |
| 2013/0022038 A1* | 1/2013 | Cadiz | H04M 19/042 370/352 |
| 2013/0145295 A1 | 6/2013 | Bocking et al. | |
| 2019/0268464 A1* | 8/2019 | Bocking | H04M 15/28 |

FOREIGN PATENT DOCUMENTS

| | | |
|---|---|---|
| GB | 2259429 A | 3/1993 |
| JP | 05063854 A | 3/1993 |
| JP | 09018573 A | 1/1997 |
| JP | 10126484 A | 5/1998 |
| JP | 10145484 A | 5/1998 |
| JP | 11275209 A | 10/1999 |
| JP | 2000069156 A | 3/2000 |
| JP | 2000253373 A | 9/2000 |
| JP | 2001036630 A | 2/2001 |
| JP | 2001186279 A | 7/2001 |
| JP | 2002199086 A | 7/2002 |
| JP | 2002261918 A | 9/2002 |
| JP | 2003060779 A | 2/2003 |
| JP | 2003179679 A | 6/2003 |
| JP | 2003219018 A | 7/2003 |
| JP | 2003264625 A | 9/2003 |
| JP | 2004023292 A | 1/2004 |
| JP | 2004199156 A | 7/2004 |
| JP | 2004221902 A | 8/2004 |
| JP | 2004229214 A | 8/2004 |
| KR | 1020020096578 A | 12/2002 |
| KR | 1020030037832 A | 5/2003 |

OTHER PUBLICATIONS

Japanese Office Action dated Nov. 13, 2014; Application No. 2013-000921; 11 pages.
Japanese Office Action dated Feb. 25, 2015; Application No. 2013-000921; 4 pages.
Office Action dated Nov. 17, 2009; U.S. Appl. No. 11/688,444, filed Mar. 20, 2007; 18 pages.
Final Office Action dated May 18, 2010; U.S. Appl. No. 11/688,444, filed Mar. 20, 2007; 10 pages.
Office Action dated Aug. 27, 2010; U.S. Appl. No. 11/688,444, filed Mar. 20, 2007; 10 pages.
Final Office Action dated Feb. 3, 2011; U.S. Appl. No. 11/688,444, filed Mar. 20, 2007; 12 pages.
Office Action dated Jun. 22, 2011; U.S. Appl. No. 11/688,444, filed Mar. 20, 2007; 10 pages.
Final Office Action dated Nov. 17, 2011; U.S. Appl. No. 11/688,444, filed Mar. 20, 2007; 11 pages.
Notice of Allowance dated Jan. 31, 2012; U.S. Appl. No. 11/688,444, filed Mar. 20, 2007; 10 pages.
Office Action dated Feb. 7, 2013; U.S. Appl. No. 13/163,464, filed Jun. 17, 2011; 34 pages.
Final Office Action dated May 31, 2013; U.S. Appl. No. 13/163,464, filed Jun. 17, 2011; 15 pages.
Notice of Allowance dated Aug. 20, 2013; U.S. Appl. No. 13/163,464, filed Jun. 17, 2011; 6 pages.
Office Action dated Nov. 18, 2011; U.S. Appl. No. 13/244,860, filed Sep. 26, 2011; 8 pages.
Notice of Allowance dated Apr. 3, 2012; U.S. Appl. No. 13/244,860, filed Sep. 26, 2011; 14 pages.
Office Action dated Aug. 27, 2012; U.S. Appl. No. 13/495,846, filed Jun. 13, 2012; 12 pages.
Notice of Allowance dated Dec. 11, 2012; U.S. Appl. No. 13/495,846, filed Jun. 13, 2012; 9 pages.
Office Action dated Sep. 11, 2014; U.S. Appl. No. 14/083,075, filed Nov. 18, 2013; 26 pages.
Final Office Action dated Dec. 19, 2014; U.S. Appl. No. 14/083,075, filed Nov. 18, 2013; 9 pages.
Advisory Action dated Mar. 5, 2015; U.S. Appl. No. 14/083,075, filed Nov. 18, 2013; 7 pages.
Office Action dated Apr. 14, 2017; U.S. Appl. No. 14/083,075, filed Nov. 18, 2013; 18 pages.
Notice of Allowance dated Aug. 4, 2017; U.S. Appl. No. 14/083,075, filed Nov. 18, 2013; 9 pages.
Office Action dated May 3, 2018; U.S. Appl. No. 15/820,088, filed Nov. 21, 2017; 26 pages.
Final Office Action dated Sep. 6, 2018; U.S. Appl. No. 15/820,088, filed Nov. 21, 2017; 12 pages.
Advisory Action dated Nov. 13, 2018; U.S. Appl. No. 15/820,088, filed Nov. 21, 2017; 2 pages.
Notice of Allowance dated Dec. 28, 2018; U.S. Appl. No. 15/820,088, filed Nov. 21, 2017; 11 pages.
Brazilian Office Action; dated Apr. 16, 2018; Application No. PI 0503818-9; 8 pages.
Canadian Office Action dated Jun. 6, 2011; Application No. 2,519,032; 3 pages.
Canadian Office Action dated Nov. 21, 2012; Application No. 2,519,032; 4 pages.
Canadian Office Action dated Apr. 25, 2014; Application No. 2,519,032; 2 pages.
Indian Office Action; Application No. 2430/DEL/2005; dated Mar. 27, 2012; 1 page.
Japanese Office Action; Application No. 2005-264467; dated Oct. 9, 2012; 5 pages.
Japanese Office Action; Application No. 2010-291310; dated Apr. 8, 2013; 8 pages.
Korean Office Action dated Apr. 27, 2011; Application No. 10-2005-0085135; 6 pages.
Korean Office Action dated Jan. 30, 2012; Application No. 10-2005-0085135; 7 pages.
Korean Office Action dated Sep. 27, 2012; Application No. 10-2005-0085135; 6 pages.
Korean Office Action dated Feb. 27, 2013; Application No. 10-2012-0135132; 10 pages.
Japanese Office Action dated Jan. 8, 2014; Application No. 2013-000921; 4 pages.

* cited by examiner

HANDHELD ELECTRONIC DEVICE HAVING IMPROVED PHONE CALL LOG, AND ASSOCIATED METHOD

CROSS-REFERENCE TO RELATED APPLICATIONS

This application is a continuation of U.S. patent application Ser. No. 15/820,088 filed on Nov. 21, 2017, by Andrew Douglas Bocking, et al., entitled "Handheld Electronic Device Having Improved Phone Call Log, and Associated Method", which is a continuation of U.S. Pat. No. 9,843,666 issued on Dec. 12, 2017 entitled, "Handheld Electronic Device Having Improved Phone Call Log, and Associated Method", which is a continuation of U.S. Pat. No. 8,620,289 issued on Dec. 31, 2013 entitled, "Handheld Electronic Device Having Improved Phone Call Log, and Associated Method", which is a continuation of U.S. Pat. No. 8,175,259 issued on May 8, 2012 entitled, "Handheld Electronic Device Having Improved Phone Call Log, and Associated Method", which is a continuation of U.S. Pat. No. 7,280,652 issued on Oct. 9, 2007 entitled, "Handheld Electronic Device Having Improved Phone Call Log, and Associated Method", all of which are incorporated by reference herein as if reproduced in their entirety.

BACKGROUND

The invention relates generally to handheld electronic devices and, more particularly, to a handheld electronic device having an improved phone call log. The invention also relates to a method of logging and displaying information relating to phone calls placed with and received or missed by a handheld electronic device.

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include cellular telephone functionality. Such devices often store a log of phone calls placed, received and/or missed by the device in what is commonly referred to as a call log. Information contained in the call log may be selectively accessed by and displayed to the user of the handheld electronic device. Such information is useful to the user to, among other things, help to recall if and when a particular phone call was placed, received, or missed, and to access information about the call such as, for example, the associated telephone number or the name, address or email address of the person associated with the call.

Prior art call logs typically display the phone call information to the user chronologically based on the time and date associated with each call, usually beginning with the most recent call first. Some prior art call logs group and display the logged calls based on the category in which the call falls, i.e., a missed call, a received called, or a placed call. In this case, the calls are still typically displayed chronologically. No effort has been made, however, in the known prior art to group or link together all logged calls that are associated with the same originating or dialed phone number or contact person so that the user of the handheld electronic device can have a contact based view of phone call history. Thus, with known prior art call logs, if a user is interested in knowing the history of calls associated with a particular originating or dialed phone number or contact person, the user must manually search through the chronologically organized call log for all entries for that phone number or contact person.

SUMMARY

An improved handheld electronic device and an associated method provide an improved call log that presents information relating to logged phone calls in a collapsed manner, meaning that for each phone number having a call stored in the memory of the device, only the most recent in time call is listed on the call log. Another aspect of the invention is to provide a call history for any phone call from the improved call log that is selected by the user. The call history includes a listing of all of the calls stored by the device that are associated with the selected call log call.

These and other aspects of the invention are provided by a method of providing a call log on a handheld electronic device including storing call related information for a plurality of outgoing and incoming phone calls, wherein each of the phone calls is associated with a phone number, compiling a list of call log phone calls, with the call log phone calls being the most recent stored phone call for each of the phone numbers, and displaying the list to a user of the handheld electronic device. The list may include call log information for each of the call log phone calls that may include one or more of the date and time of the call, the phone number associated with the call, and a contact name associated with the call. The call log may display the calls in chronological order, beginning with the most recent call first. The method may further include displaying portions of the call related information for a selected call log call, such as the date, time and duration of and the phone number associated with the selected call.

According to a further aspect of the invention, the method may further include displaying a call history for one of the call log calls selected by the user. The call history preferably includes a listing of all of the stored phone calls associated with the phone number of the selected call log call.

According to still a further aspect of the invention, the method may include providing a menu of user options to the user for either a selected call log call or a selected call history call. The method may further include performing a function associated with the user option that is selected by the user.

According to another aspect of the invention, an improved handheld electronic device having an improved call log capability is provided that includes a display, a processor and a memory storing one or more applications executable by the processor. The one or more applications include instructions for performing the various embodiments of the improved method of proving a call log described above.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
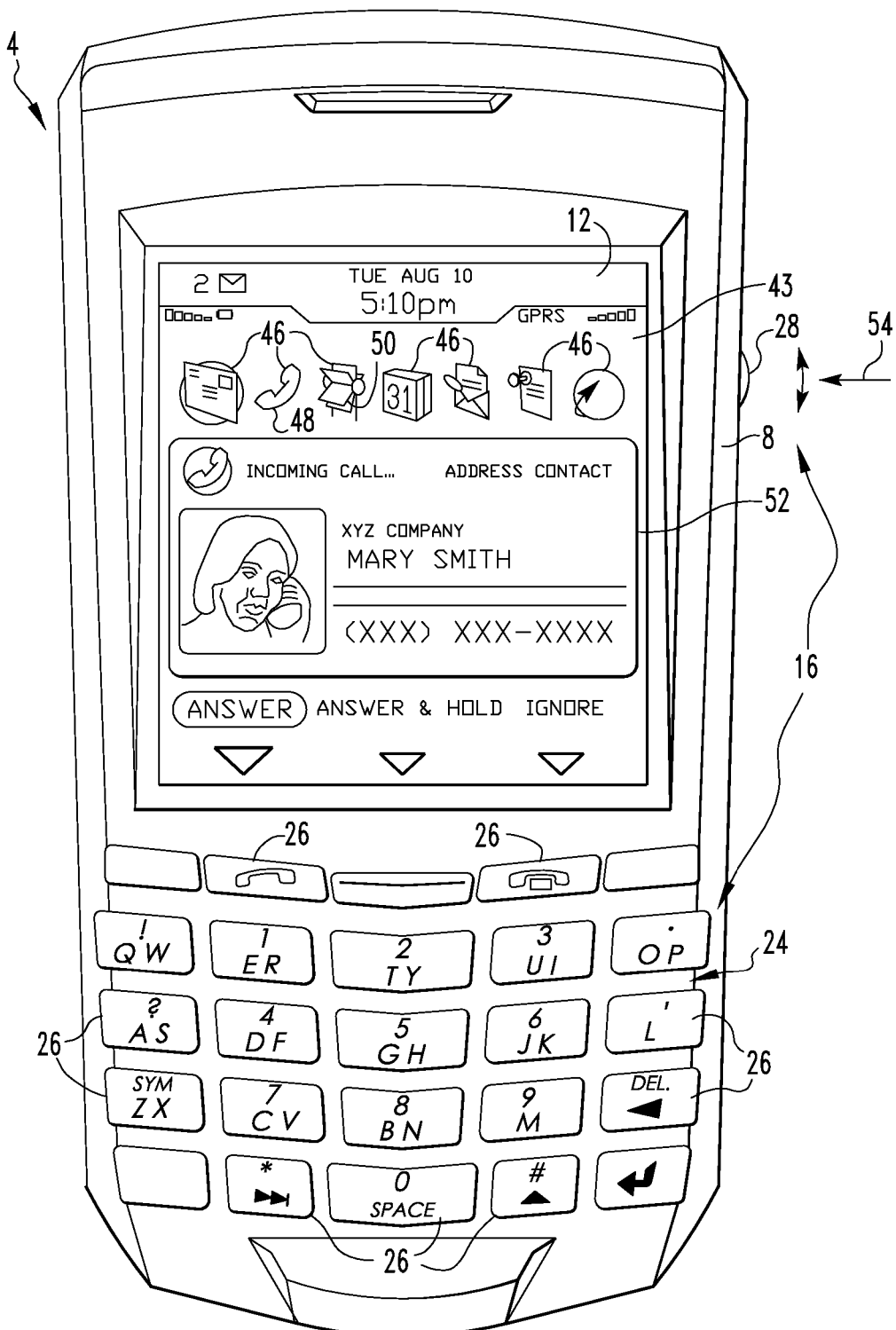
FIG. 1 is a front view of an improved handheld electronic device in accordance with the invention.
Figure 2:
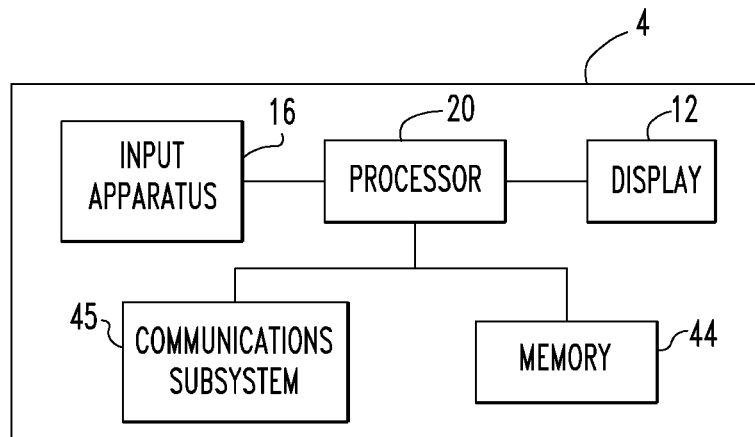
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein. The handheld electronic device 4 is of a type that includes a cellular telephone capability which, as will be described in greater detail below, provides an improved call log in accordance with the invention. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. As used herein, the expression "function" and variations thereof can refer to any type of application program, process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobiltex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. Together, processor 20, memory 44 and communications subsystem 45 may, along with other components (having various types of functionality), be referred to as a processing unit.

In FIG. 1, the display 12 is depicted as displaying a home screen 43 that includes a number of applications depicted as discrete icons 46, including an icon representing a phone application 48 and an address book application 50. As is known in the art, address book application 50 allows the user of handheld electronic device 4 to store information for a number of "contacts," including, among other things, the contact's name, phone number, home and office addresses, email address, and other information that may be used to contact the person. In FIG. 1, the home screen 43 is currently active and would constitute a portion of an application. In addition, display 12 shown in FIG. 1 shows a pop-up box 52 that indicates that there is currently a phone call coming into handheld electronic device 4. Pop-up box 52 provides certain information relating to the incoming call, including, for example, the caller's phone number and identifying information if the caller and phone number are stored as a contact by address book application 50 of handheld electronic device 4. Other applications, such as the phone application 48 or address book application 50, can be initiated from the home screen 43 by providing an input through the input apparatus 16, such as by rotating the thumbwheel 28 and providing a selection input by translating the thumbwheel 28 in the direction indicated by the arrow 54 in FIG. 1.

Phone application 48 stores in memory 44 certain information relating to all outgoing phone calls placed with and incoming phone calls received or missed by handheld electronic device 4. The stored information may include, without limitation, the date and time of the call, the phone number associated with the call, and the duration of the call. Phone application 48 of handheld electronic device 4 includes routines for providing an improved call log for providing information to the user of handheld electronic device 4 relating to outgoing phone calls placed using handheld electronic device 4 and incoming phone calls received and/or missed by handled electronic device 4.

Figure 3:
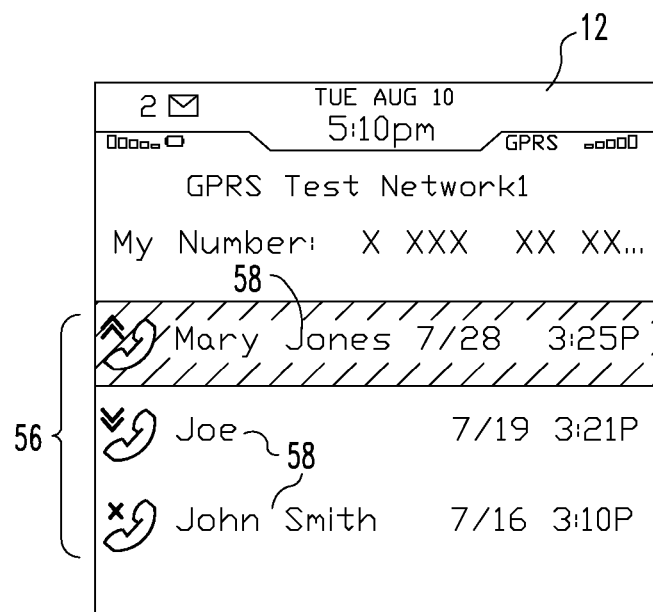
FIG. 3 is a view of a portion of the display of the handheld electronic device of FIG. 1 showing a call log in accordance with the invention.

FIG. 3 is an exemplary depiction of display 12 showing call log 56 including a plurality of calls 58 according to the invention. Call log 56 displays logged calls in a collapsed manner, meaning that for each phone number having information relating to a call or calls stored in memory 44 by phone application 48, only the most recent in time call 58 is listed on call log 56. Thus, each individual phone number having information relating to a call or calls stored in memory 44 will have a single entry in call log 56. Preferably, each of the call log calls 58 listed on call log 56 will include the date and time of the call, an icon indicating the nature of the call (i.e., placed, received or missed), and either the name of the caller or person called if that person and the phone number in question are stored as a contact by address book application 50, or the phone number associated with the call if the caller or called person is not stored as a contact. Also, call log 56 preferably lists the call log calls 58 in chronological order, beginning with the most recent call first. As will be described in greater detail below, a user of handheld electronic device 4 may select a particular call 58 from call log 56 and cause a call history associated with the selected call 58 to be displayed on display 12. In particular, the displayed call history will list all calls, incoming and outgoing, stored in memory 44 that are associated with the phone number associated with the selected call 58. The calls in the call history are preferably listed in chronological order beginning with the most recent call (which, as will be appreciated, will be the selected call 58 from call log 56).

Figure 4:
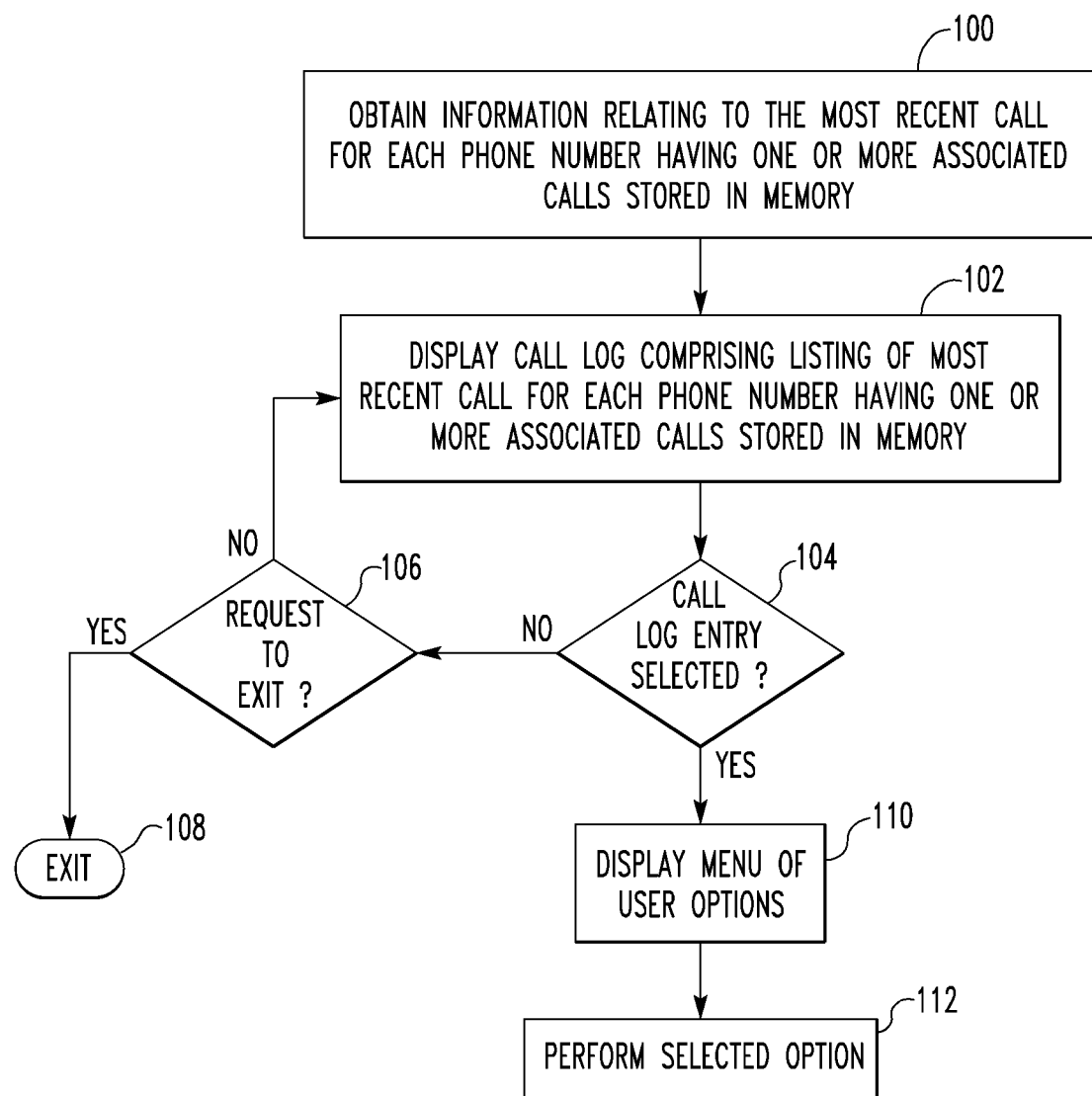
FIG. 4 is a flowchart depicting a portion of a routine executed by a processor of the handheld electronic device of FIG. 1 for creating and displaying a call log in accordance with the invention.

A flowchart depicting a routine performed by processor 20 for creating and implementing call log 56 of the invention is shown in FIG. 4. In one embodiment, the routine of FIG. 4 is initiated and call log 56 is created any time phone application 48 is activated by the user of handheld electronic device 4, such that call log 56 will be the default initial view provided on display 12 for phone application 48. Alternatively, the routine shown in FIG. 4 may be initiated and call log 56 may be created and displayed upon request by the user from some other portion of phone application 48.

As shown in FIG. 4, the method begins at 100, where processor 20 obtains from memory 44 information relating to the most recent call, incoming or outgoing, for each phone number that has one or more associated calls stored in memory 44. Next, at 102, a list that includes the most recent in time call for each phone number having one or more associated calls stored in memory 44 is compiled and displayed on display 12 as call log 56. As described above, an example call log 56 is shown in FIG. 3. As used herein, the term "list" shall refer to a compilation of a series of items of information one after another that may or may not be in a predetermined order.

Next, at 104, a determination is made as to whether one of the calls 58 included as an entry on call log 56 is selected by the user, such as by highlighting the call 58 using input apparatus 16. If the answer at 104 is no, then at 106, a determination is made as to whether the user has provided a request using input apparatus 16, to exit either phone application 48 in the embodiment where call log 56 is displayed as the default view for phone application 48 or the call log view (and return to the default phone application view) in the embodiment where call log 56 is not displayed as the default view for phone application 48 but rather must be selected by user. If the answer at step 106 is yes, then the appropriate exit steps are taken at 108. If the answer is no, then the method returns to 102 to continue displaying call log 56.

Figures 5, 7:
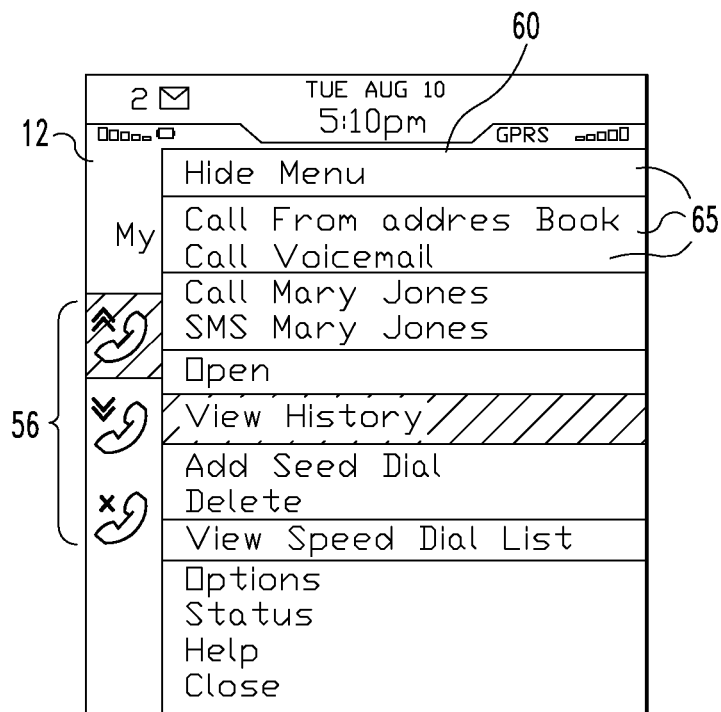
FIG. 5 is a view of a portion of the display of the handheld electronic device of FIG. 1 showing a call log and a user option menu in accordance with the invention.
FIG. 7 is a view of a portion of a display of the handheld electronic device of FIG. 1 showing a call history in accordance with the invention.

If, however, the answer at 104 is yes, meaning a call 58 has been chosen by the user, then at 110 a menu 60 of user options 65 is displayed on display 12 as shown in FIG. 5. User options 65 include a number of different functions of handheld electronic device 4 that may be implemented by selecting one of the user options 65. As shown in FIG. 5, such functions may include, without limitation, initiating an application for handheld electronic device 4 for closing menu 60, for calling a selected contact stored by address book application 50, for calling the user's voicemail, for calling the contact listed in call 58, for creating and sending a short message service (SMS) message to the contact listed in call 58, for opening the call 58 to display detailed call information relating to call 58 that is stored in memory 44, for creating and displaying on display 12 a call history for call 58 as described in more detail below, for adding the phone number associated with call 58 to the speed dial list maintained by phone application 48, for deleting call 58 from call log 56, for viewing the speed dial list maintained by phone application 48, for viewing and changing operating options for phone application 48, for viewing status information relating to, for example, the duration of the last call, the total number of minutes for all calls, and the phone number of handheld electronic device 4, for providing help to the user, and for closing phone application 48. Next, at 112 of FIG. 4, handheld electronic device 4 performs the function associated with the selected user option 65, whatever it may be.

Figure 6:
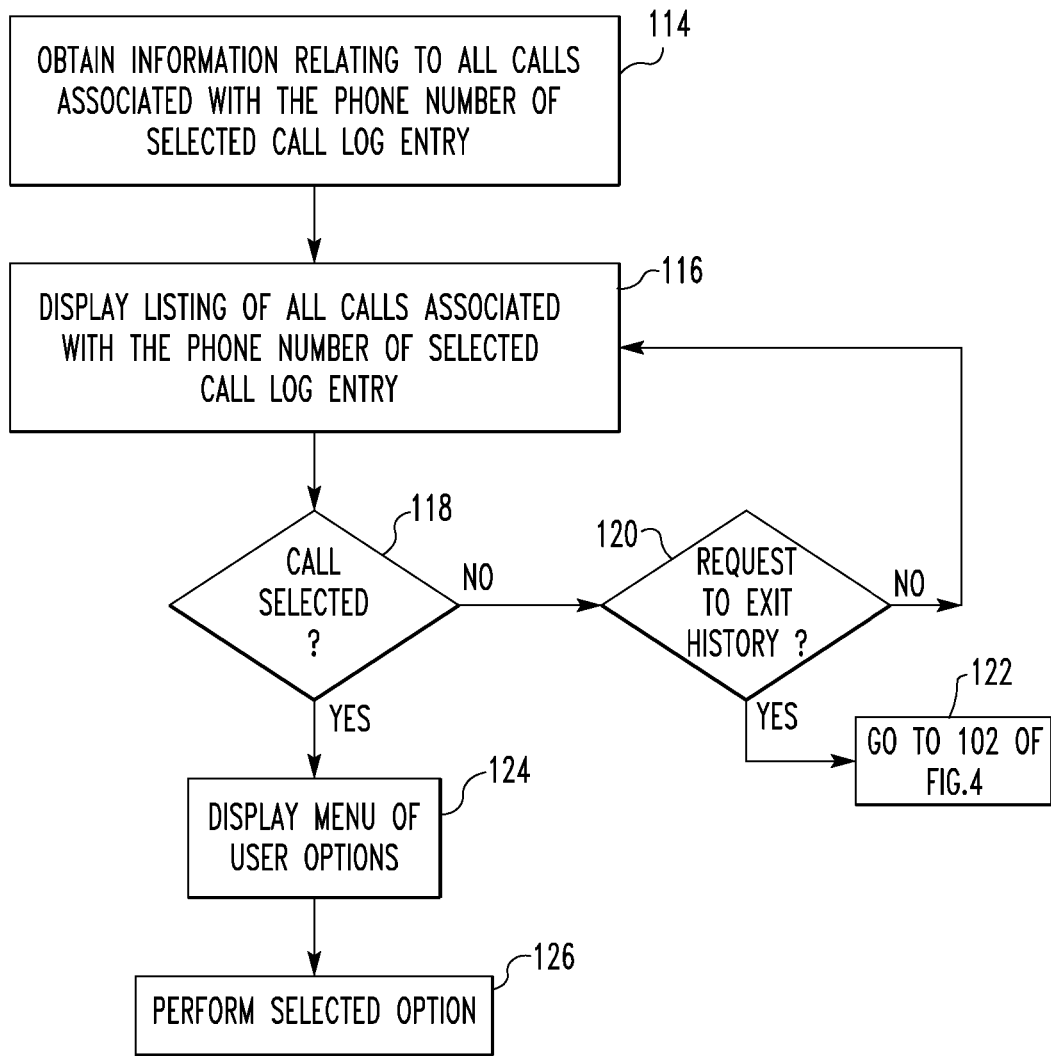
FIG. 6 is a flowchart depicting a portion of a routine executed by a processor of the handheld electronic device of FIG. 1 for creating and displaying a call history in accordance with the invention.

Referring to FIG. 6, a flowchart depicting a routine performed by processor 20 for displaying a call history according to the invention is shown. This routine will be initiated if the "view history" user option 65 of menu 60 (FIG. 5) is selected by the user after a particular call 58 has been selected. At 114, processor 20 obtains from memory 44 the call information for all calls associated with the phone number of selected call 58. As an alternative, if the phone number of chosen call 58 matches the phone number of a contact stored by address book application 50, call information for all calls associated with that contact may be obtained at step 114. At 116, a listing of the calls obtained at 114 is created and displayed, along with other information, on display 12 as shown in FIG. 7. As seen on FIG. 7, in addition to the listing of calls, the call history may include, without limitation, the name and phone number associated with the chosen call 58, the nature (i.e., place, received or missed) and duration of the last call, and the number of calls included in the history. Next, at 118 of FIG. 6, a determination is made as to whether a particular call from the displayed list is selected. If no call is selected, then at 120, it is determined whether the user has provided a request to exit the call history functionality. If the answer is yes, then at 122, the method returns to 102 of FIG. 4 wherein call log 56 is displayed. If, however, a call from the displayed list is selected as determined at 118, then, at 124, a menu of user options is displayed similar to menu 60 of user option 65 shown in FIG. 5. Next, at 126, handheld electronic device 4 performs the selected user option, whatever it may be.

Thus, the invention provides a handheld electronic device having functionality for providing a collapsed call log that gives a user a contact and/or phone number based view of the logged calls. In this manner, the user may readily access, view and request functions for all logged calls associated with a particular contact and/or originating or dialed phone number.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A device comprising:
a memory; and
a processor coupled to the memory, the processor, working together with the memory, configured to:
detect a first call associated with a contact or phone number;
detect a second call associated with the contact or phone number;
display a single entry from a communications log, the entry associated with a most recent one of the first call or the second call; and
display at least part of a listing after the entry is selected, the listing comprising communications-related information associated with the contact or phone number, the listing including communications-related information for the first call and communications-related information for the second call.

2. The device of claim 1, wherein the communications-related information for the first call comprises a date of the first call and the communications-related information for the second call comprises a date of the second call.

3. The device of claim 1, wherein the communications-related information for the first call comprises a time of the first call and the communications-related information for the second call comprises a time of the second call.

4. The device of claim 1, wherein the listing comprises one or more of an outgoing call icon, an incoming call icon, or a missed call icon.

5. The device of claim 1, wherein the communications-related information for the first call comprises a duration of the first call and the communications-related information for the second call comprises a duration of the second call.

6. The device of claim 1, wherein the communications-related information associated with the contact or phone number comprises a count of calls associated with the contact or phone number.

7. The device of claim 1, wherein the processor is further configured to initiate a new outgoing call to the contact or phone number when a call contact option is selected.

8. The device of claim 1, wherein the first call comprises a phone call.

9. The device of claim 1, wherein the second call comprises a phone call.

10. The device of claim 1, wherein the first call comprises an incoming call.

11. The device of claim 1, wherein the second call comprises an incoming call.

12. The device of claim 1, wherein the first call comprises an outgoing call.

13. The device of claim 1, wherein the second call comprises an outgoing call.

14. The device of claim 1, wherein the first call comprises a missed call.

15. The device of claim 1, wherein the second call comprises a missed call.

16. The device of claim 1, wherein the first call comprises an incoming call and the second call comprises an outgoing call.

17. The device of claim 1, wherein the first call comprises an outgoing call and the second call comprises an incoming call.

18. A method comprising:
detecting a first call associated with a contact or phone number;
detecting a second call associated with the contact or phone number;
displaying a single entry from a communications log, the entry associated with a most recent one of the first call or the second call; and
displaying at least part of a listing after the entry is selected, the listing comprising communications-related information associated with the contact or phone number, the listing including communications-related information for the first call and communications-related information for the second call.

19. A non-transitory computer readable medium comprising instructions that when executed by a processor cause the processor to:
detect a first call associated with a contact or phone number;
detect a second call associated with the contact or phone number;
display a single entry from a communications log, the entry associated with a most recent one of the first call or the second call; and
display at least part of a listing after the entry is selected, the listing comprising communications-related information associated with the contact or phone number, the listing including communications-related information for the first call and communications-related information for the second call.

* * * * *